United States Patent
Bahrami et al.

(10) Patent No.: US 11,248,916 B2
(45) Date of Patent: Feb. 15, 2022

(54) ENHANCED VEHICLE OPERATION

(71) Applicant: Ford Global Technologies, LLC, Dearborn, MI (US)

(72) Inventors: Mohsen Bahrami, Troy, MI (US); Navid Tafaghodi Khajavi, Troy, MI (US); Amin Ariannezhad, Troy, MI (US); Hamed Asadi, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 133 days.

(21) Appl. No.: 16/750,628

(22) Filed: Jan. 23, 2020

(65) Prior Publication Data

US 2021/0231443 A1   Jul. 29, 2021

(51) Int. Cl.
*G01C 21/32* (2006.01)
*G05D 1/02* (2020.01)

(52) U.S. Cl.
CPC .......... *G01C 21/32* (2013.01); *G05D 1/0212* (2013.01); *G05D 1/0276* (2013.01); *G05D 1/0291* (2013.01); *G05D 2201/0213* (2013.01)

(58) Field of Classification Search
CPC ........ G01C 21/28; G01C 21/34; G01C 21/36; G01C 21/3667; G01C 21/3484; G01C 21/3492; G01C 21/26; G01C 21/00; G05D 1/02; G05D 1/274; G08G 1/969; G08G 1/137; G09B 29/00; G09B 29/10
See application file for complete search history.

(56) References Cited

U.S. PATENT DOCUMENTS

| | | | |
|---|---|---|---|
| 2018/0189323 A1* | 7/2018 | Wheeler | G01C 21/00 |
| 2019/0265045 A1 | 8/2019 | Baik et al. | |
| 2020/0084193 A1* | 3/2020 | Beaurepaire | H04L 63/105 |
| 2021/0063168 A1* | 3/2021 | Rolf | G01C 21/3815 |

FOREIGN PATENT DOCUMENTS

| | | |
|---|---|---|
| EP | 1121675 B1 | 4/2006 |
| JP | 2002328598 A | 11/2002 |
| JP | 4902463 B2 | 1/2012 |
| JP | 6416948 B2 | 10/2018 |

* cited by examiner

*Primary Examiner* — Jess Whittington
*Assistant Examiner* — Terry C Buse
(74) *Attorney, Agent, or Firm* — Frank A. MacKenzie; Bejin Bieneman PLC

(57) ABSTRACT

A computer is programmed to divide respective data of a first high-resolution map of a first geographic area and a second high-resolution map of a second geographic area into a plurality of respective subsets, assign one of the subsets of each of the first high-resolution map and the second high-resolution map to a first vehicle and a second vehicle, identify respective locations of the first vehicle and the second vehicle and the one of the first high-resolution map or the second high-resolution map that includes the locations of the first and second vehicles, and send, to the first and second vehicles, a map dataset that is a result of applying an XOR function to (1) the subset of the identified high-resolution map including the location of the first vehicle and (2) the subset of the identified high-resolution map including the location of the second vehicle.

20 Claims, 8 Drawing Sheets

ENHANCED VEHICLE OPERATION

BACKGROUND

Vehicles can include map data stored in a memory of a vehicle computer. The map data can include, e.g., geo-coordinate data (e.g., GPS data), data about roadway markings, data about landmarks, etc. Map data can consume significant amounts of computer memory storage. A vehicle computer memory storage can be insufficient for map data needed or desired to support vehicle route planning and/or navigation. Further, network resources to transfer map data to a vehicle computer can be unavailable, inefficient, and/or limited.

DETAILED DESCRIPTION

Figure 1:
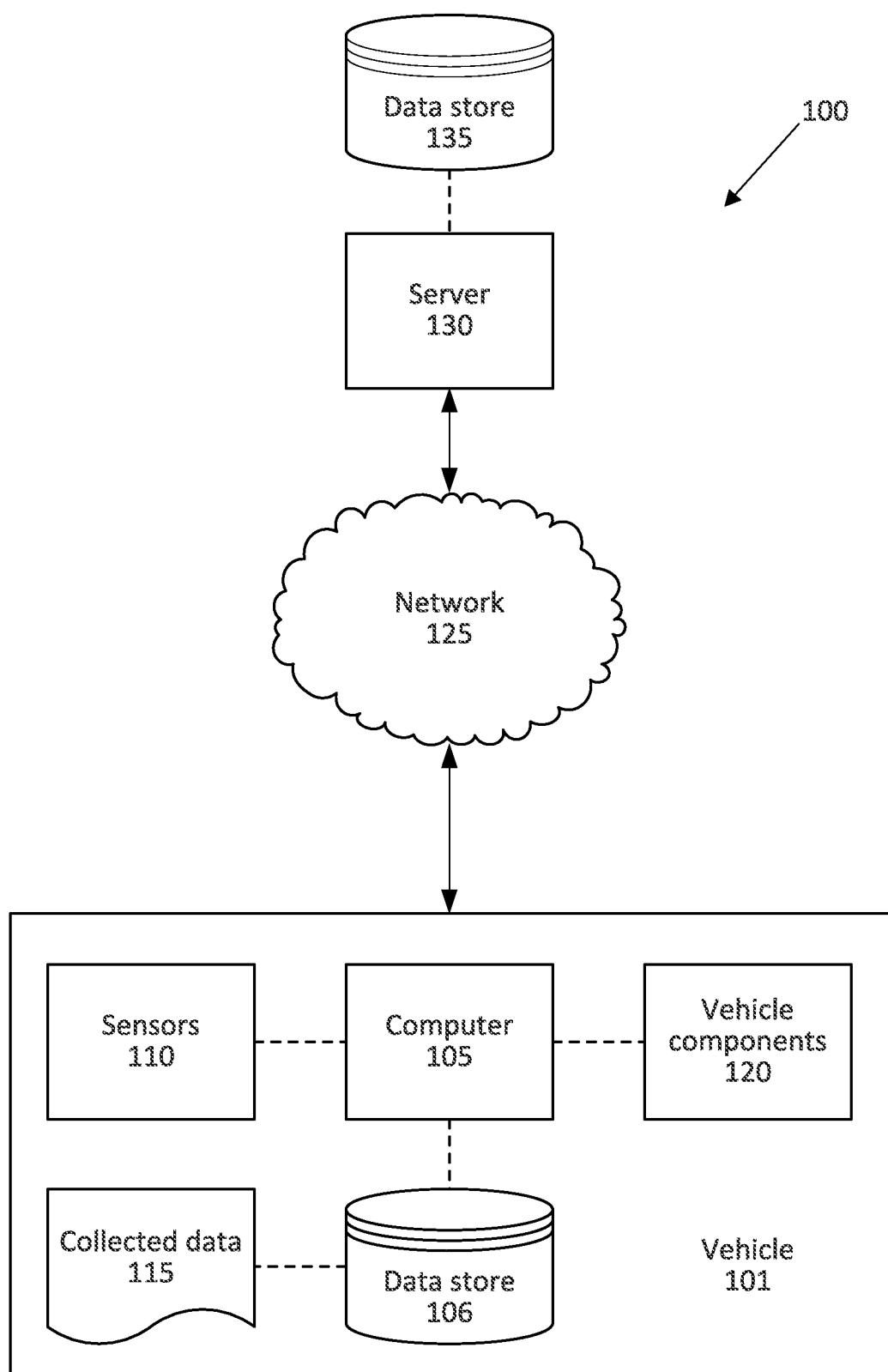
FIG. 1 is a block diagram of an example system for generating a map dataset of a geographic area.

A system includes a computer including a processor and a memory, the memory storing instructions executable by the processor to divide data of a first high-resolution map of a first geographic area into a plurality of subsets, each subset including some but not all of the data of the first high-resolution map, divide data of a second high-resolution map of a second geographic area into a plurality of subsets, each subset including some but not all of the data of the second high-resolution map, assign one of the subsets of the first high-resolution map and one of the subsets of the second high-resolution map to a first vehicle, assign a different one of the subsets of the first high-resolution map and a different one of the subsets of the second high-resolution map to a second vehicle, identify a location of the first vehicle, a location of the second vehicle, one of the first high-resolution map or the second high-resolution map that includes the location of the first vehicle, and one of the first high-resolution map or the second high-resolution map that includes the location of the second vehicle, and send, to the first vehicle and to the second vehicle, a map dataset that is a result of applying an XOR function to (1) the subset of the identified high-resolution map that includes the location of the first vehicle assigned to the first vehicle and (2) the subset of the identified high-resolution map that includes the location of the second vehicle assigned to the second vehicle.

The first vehicle can include a vehicle computer programmed to apply the XOR function to the map dataset and the assigned subset of the identified high-resolution map that includes the location of the first vehicle, the assigned subsets of the first high-resolution map and the second high-resolution map stored in the vehicle computer, to recover the data of the first high-resolution map or the data of the second high-resolution map.

The vehicle computer can be further programmed to actuate at least one of a propulsion, a brake, or a steering to move the first vehicle according to the recovered first high-resolution map or the recovered second high-resolution map.

The result of applying the XOR function of the map dataset and the assigned subset of the identified high-resolution map that includes the location of the first vehicle can be a different subset of the identified high-resolution map that includes the location of the first vehicle, and the vehicle computer can be further programed to combine the assigned subset and the different subset to recover the first high-resolution map or the second high-resolution map.

The vehicle computer can include a first low-resolution map of the first geographic area and a second low-resolution map of the second geographic area.

The second vehicle can include a second vehicle computer programmed to apply the XOR function to the map dataset and the assigned subset of the high-resolution map that includes the location of the second vehicle.

The data size of the map dataset can be smaller than a respective data size of the data of the first high-resolution map or the data of the second high-resolution map.

A combined data size of the assigned subset of the first high-resolution map and the assigned subset of the second high-resolution map and the map dataset can be smaller than a combined data size of the data of the first high-resolution map and the data of the second high-resolution map.

A bandwidth consumption to transmit the map dataset can be smaller than a respective bandwidth consumption to transmit the first high-resolution map or the second high-resolution map.

The data of the first high-resolution map can include information about roadway lanes of the first geographic area, and the first vehicle can include a low-resolution map of the first geographic area that lacks information about the roadway lanes of the first geographic area.

The instructions can further include instructions to determine a new location of the first vehicle and a new location of the second vehicle and to send a second map dataset that is a result of applying the XOR function to (1) the subset of the identified high-resolution map that includes the new location of the first vehicle and (2) the subset of the identified high-resolution map that includes the new location of the second vehicle.

The instructions can further include instructions to identify respective locations of a plurality of first vehicles in a first fleet and respective locations of a plurality of second vehicles in a second fleet and to send, to the first fleet and to the second fleet, the map dataset based on the respective locations of the plurality of first vehicles and the respective locations of the plurality of second vehicles.

A method includes dividing data of a first high-resolution map of a first geographic area into a plurality of subsets, each subset including some but not all of the data of the first high-resolution map, dividing data of a second high-resolution map of a second geographic area into a plurality of subsets, each subset including some but not all of the data of the second high-resolution map, assigning one of the subsets of the first high-resolution map and one of the subsets of the second high-resolution map to a first vehicle, assigning a different one of the subsets of the first high-resolution map and a different one of the subsets of the second high-resolution map to a second vehicle, identifying a location of the first vehicle, a location of the second vehicle, one of the first high-resolution map or the second high-resolution map that includes the location of the first vehicle, and one of the first high-resolution map or the second high-resolution map that includes the location of the second vehicle, and sending, to the first vehicle and to the second vehicle, a map dataset that is a result of applying an XOR function to (1) the subset of the identified high-resolution map that includes the location of the first vehicle assigned to the first vehicle and (2) the subset of the identified high-resolution map that includes the location of the second vehicle assigned to the second vehicle.

The method can further include determining a new location of the first vehicle and a new location of the second vehicle and to send a second map dataset that is a result of applying the XOR function to (1) the subset of the identified high-resolution map that includes the new location of the first vehicle and (2) the subset of the identified high-resolution map that includes the new location of the second vehicle.

The method can further include identifying respective locations of a plurality of first vehicles in a first fleet and respective locations of a plurality of second vehicles in a second fleet and to send, to the first fleet and to the second fleet, the map dataset based on the respective locations of the plurality of first vehicles and the respective locations of the plurality of second vehicles.

A system includes a first vehicle including a first vehicle computer, a second vehicle including a second vehicle computer, a server in communication with the first vehicle computer and the second vehicle computer over a network, means for dividing data of a first high-resolution map of a first geographic area into a plurality of subsets, each subset including some but not all of the data of the first high-resolution map, means for dividing data of a second high-resolution map of a second geographic area into a plurality of subsets, each subset including some but not all of the data of the second high-resolution map, means for assigning one of the subsets of the first high-resolution map and one of the subsets of the second high-resolution map to the first vehicle computer, means for assigning a different one of the subsets of the first high-resolution map and a different one of the subsets of the second high-resolution map to the second vehicle computer, means for identifying a location of the first vehicle, a location of the second vehicle, one of the first high-resolution map or the second high-resolution map that includes the location of the first vehicle, and one of the first high-resolution map or the second high-resolution map that includes the location of the second vehicle, and means for sending, to the first vehicle computer and to the second vehicle computer, a map dataset that is a result of applying an XOR function to (1) the subset of the identified high-resolution map that includes the location of the first vehicle assigned to the first vehicle and (2) the subset of the identified high-resolution map that includes the location of the second vehicle assigned to the second vehicle.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

High-resolution map data may consume significant computing and/or network resources to transmit from a central server over a wireless network including, e.g., a cellular network. Memory limitations on a vehicle computer, such as cache size and memory space, limit an amount of high-resolution map data that the vehicle computer can store. These connectivity limitations and local memory constraints limit the transmission and use of high-resolution maps useful and/or necessary for vehicle operation.

By dividing high-resolution maps into subsets, assigning fewer than all subsets to each of a plurality of vehicles, and using the locations of respective vehicles to specify which additional subsets to transmit to each vehicle, a system as disclosed herein can reduce data transmission over the network and improve memory storage efficiency for vehicle computers. Transmitting the subsets as exclusive disjunctions (as further explained below) allows a server to transmit less data over the network than otherwise required and allows the vehicle computers to recover missing subsets to complete the high-resolution map for their current location. This improvement in network and memory efficiency further advantageously provides faster navigation operation for autonomous vehicles.

FIG. 1 illustrates an example system 100 for generating a map of a geographic area for a plurality of vehicles 101. A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus such as a CAN bus, LIN bus etc., and or other wired and/or wireless technologies, e.g., Ethernet, WIFI, etc. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
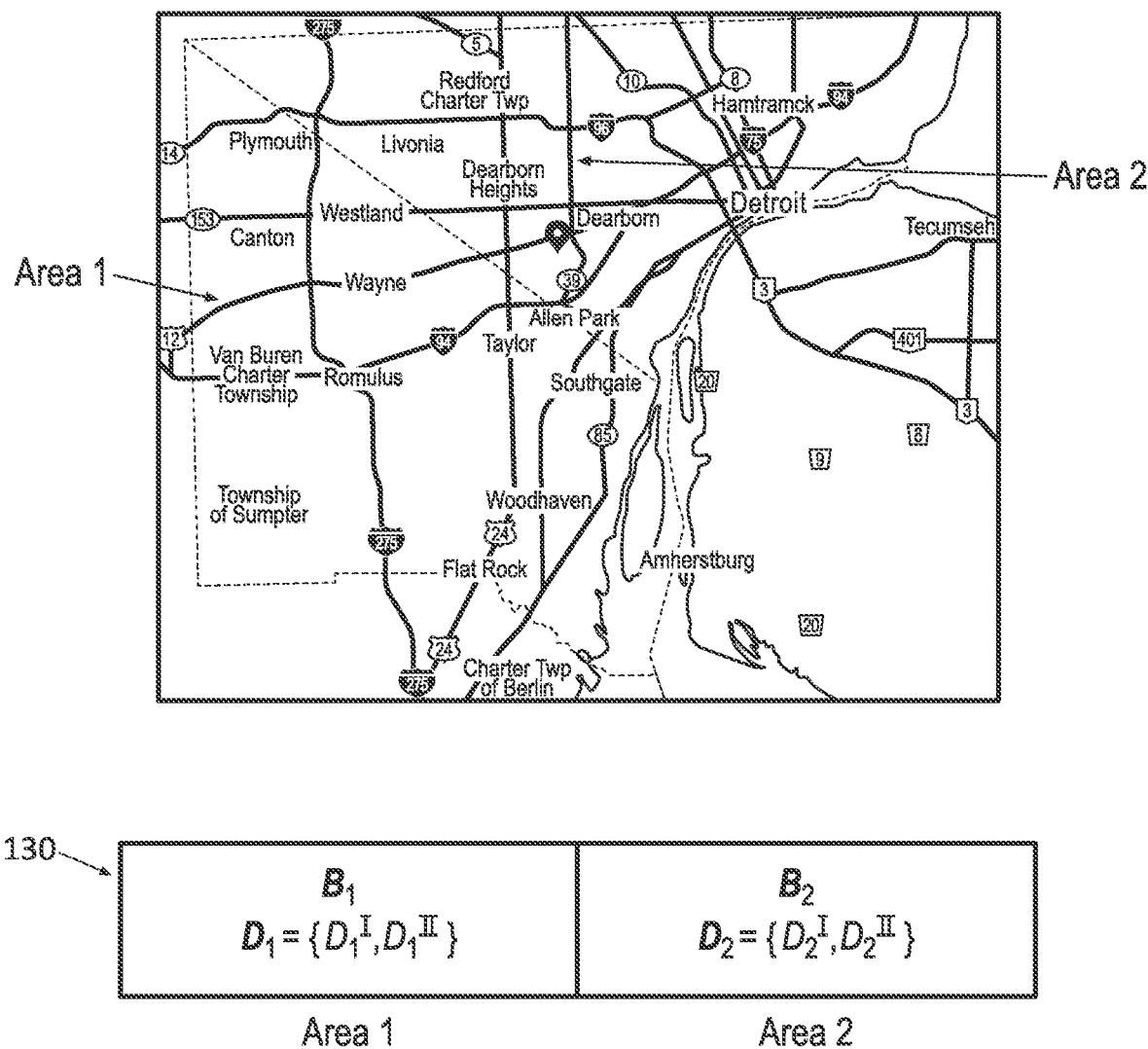
FIG. 2 is a block diagram of a plurality of geographic areas.

FIG. 2 is a view of a first geographic area and a second geographic area. In the Figures, the first geographic area is identified as "Area 1," and the second geographic area is identified as "Area 2." The first and second geographic areas can be divisions of a municipality, e.g., a city, a county, a state, etc. The server 130 can include maps of the first and second geographic areas. A "map" or "map dataset" is a set of data, i.e., a plurality of bits encoding information, that includes information about a specific geographic area. For example, a map dataset (or a subset thereof) could be stored in what is conventionally referred to as a file or data file. The data can include, e.g., geo-coordinate data, roadway lane data, lane marking data, landmarks, etc. The map can be a low-resolution map, labeled $B_1$, $B_2$ in FIG. 2. A "low-resolution" map is a map that includes a minimum amount of data for a vehicle 101 to operate in the geographic area, e.g., only geo-location data. That is, the low-resolution map may lack information about, e.g., roadway lanes, lane markings, landmarks, etc. The server 130 can include a high-resolution map, labeled $D_1$, $D_2$ in FIG. 2. A "high-resolution" map is a map that includes more data than the low-resolution map, e.g., geo-location data at a finer resolution than the low-resolution map, roadway data, lane marking data, etc. Thus, the high-resolution map has a data size greater than a data size of the low-resolution map and transmitting the high-resolution map to vehicles 101 over the network has a higher bandwidth consumption than transmitting the low-resolution map.

The server 130 can divide the high-resolution maps $D_1$, $D_2$ into a plurality of subsets. Each subset includes some but not all data of the respective high-resolution map $D_1$, $D_2$ from which the subset is generated. That is, the plurality of subsets divided from the first high-resolution map $D_1$ comprise all data of the first high-resolution map $D_1$. By dividing the high-resolution maps $D_1$, $D_2$ into a plurality of subsets, a plurality of vehicles 101 can each store one of the subsets for each high-resolution map $D_1$, $D_2$ on a respective vehicle computer 105, and the server 130 can provide the other subsets for the high-resolution maps $D_1$, $D_2$ over the network 125. For example, the server 130 can divide the high-resolution map $D_1$ into two subsets $D_1^I$, $D_1^{II}$, i.e., the server 130 can divide the binary data of the high-resolution map $D_1$ into the two subsets $D_1^I$ and $D_1^{II}$.

The server 130 can generate a map that is an exclusive disjunction of two subsets $D_1^I$, $D_1^{II}$. An "exclusive disjunction" is the result of applying an exclusive OR function (an "XOR" function) to two subsets including binary data. That is, the XOR function (represented with the $\oplus$ symbol) receives as input two binary values and outputs a 1 if the inputs are different and a 0 if the inputs are the same:

TABLE 1

| Input 1 ($I_1$) | Input 2 ($I_2$) | XOR Output ($I_1 \oplus I_2$) |
|---|---|---|
| 1 | 1 | 0 |
| 1 | 0 | 1 |
| 0 | 1 | 1 |
| 0 | 0 | 0 |

Because the subsets $D_1^I$, $D_1^{II}$ are sets of binary digits, the exclusive disjunction of the subsets $D_1^I \oplus D_1^{II}$ is a set of data, i.e., a "dataset," including the output of performing the XOR function on each pair of binary digits from the subsets $D_1^I$, $D_1^{II}$. For example, the dataset can be a file, i.e., a collection of data stored in the server 130 and/or the data store 106. That is, the exclusive disjunction of the subsets $D_1^I \oplus D_1^{II}$ is a set of data of binary digits encoding which digits differ between the subsets $D_1^I$, $D_1^{II}$. Thus, if a computer 105 includes one of the subsets, e.g., the subset $D_1^I$, the computer 105 can recover the other subset $D_1^{II}$ from the map dataset $D_1^I \oplus D_1^{II}$. That is, the computer 105 can generate the subset $D_1^{II}$ as $D_1^{II} = (D_1^I \oplus D_1^{II}) \oplus D_1^I$, i.e., the exclusive disjunction of the stored subset $D_1^I$ and the dataset $D_1^I \oplus D_1^{II}$ outputs the other subset $D_1^{II}$. With both subsets $D_1^{I}$, $D_1^{II}$, the computer 105 has a complete high-resolution map $D_1$. Thus, by storing only the subset $D_1^{I}$ and receiving the map dataset $D_1^{I} \oplus D_1^{II}$ from the server 130, the computer 105 can recover the other subset $D_1^{II}$ and complete the high-resolution map $D_1$, reducing the amount of memory used by high-resolution maps in the computer 105. Alternatively, the server 130 can divide the high-resolution maps into more than two subsets, e.g., three subsets, four subsets, etc.

Figure 8:
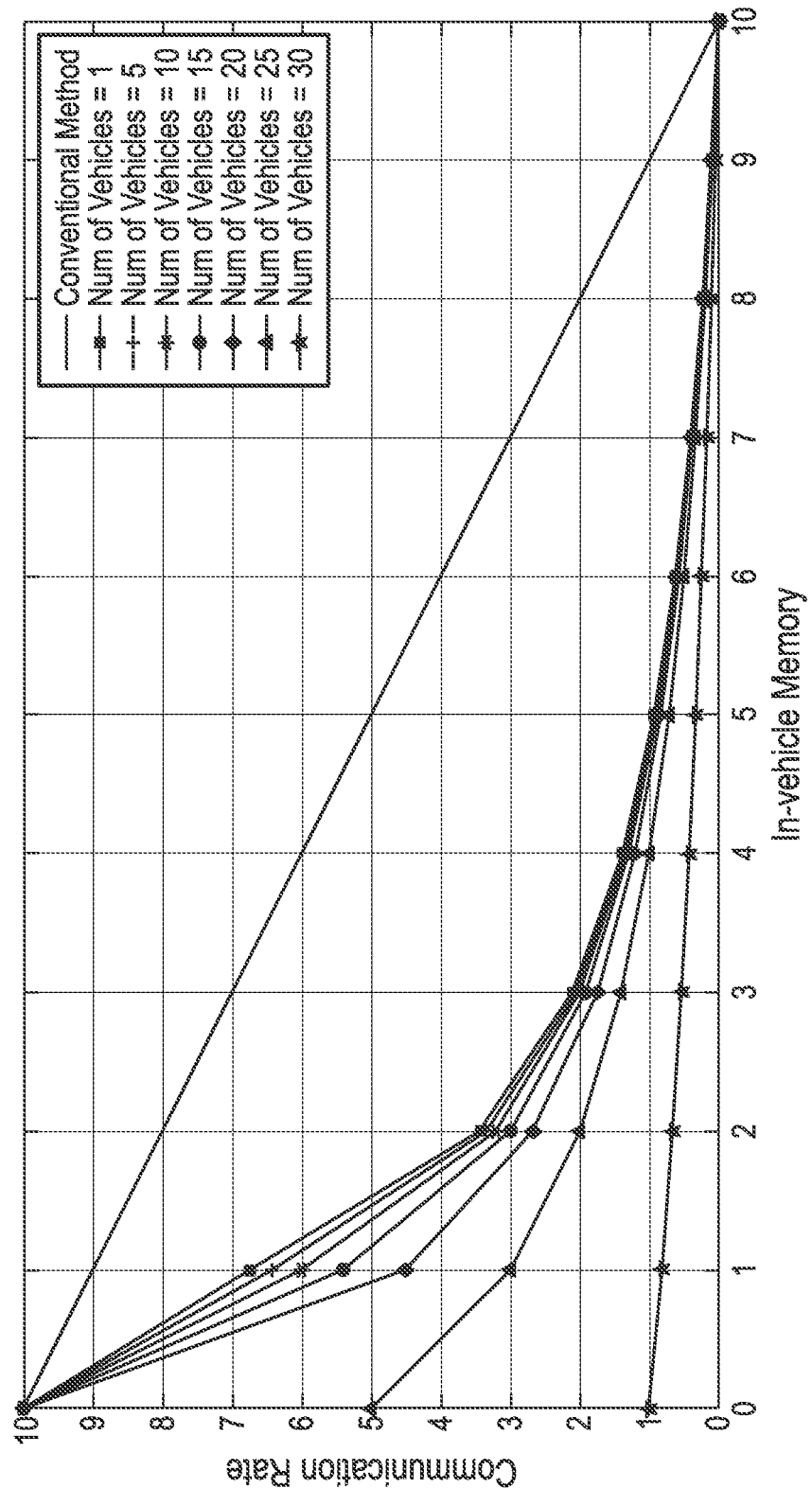
FIG. 8 is a chart of data communication rates and memory storage.

The advantages of reducing memory and bandwidth consumption are shown in the diagram of FIG. 8. FIG. 8 shows the predicted communication rate and memory usage for a specified number of datasets to different numbers of vehicles 101. The vertical Y-axis is the communication rate of the datasets over the network 125 in data per time, e.g., megabits per second. The horizontal X-axis is the amount of memory used in the computers 105 of the vehicles 101, e.g., in megabits. That is, FIG. 8 illustrates the communication rate required for a specified cache size of the computer 105. In a conventional method, this is a linear relationship, i.e., as cache size of the computer 105 increases, the communication rate decreases at a rate equal to the increase of the cache size. Using subsets of high-resolution maps and map datasets that are exclusive disjunctions of the subsets as described herein, the communication rate decreases more quickly than the increase in the cache size, shown by the symbols and lines in FIG. 8. For example, for a cache size of 3, the conventional method has a communication rate of 7, while, for 1-25 vehicles 101, the system 100 reduces the communication rate to between 1 and 2, and for 30 vehicles 101, the system 100 reduces the communication rate to below 1. Thus, the system 100 can reduce communication bandwidth consumption by about an order of magnitude compared to a conventional method, improving the data 115 storage for the computers 105 and transmission over the network 125 by the server 130.

Figure 3:
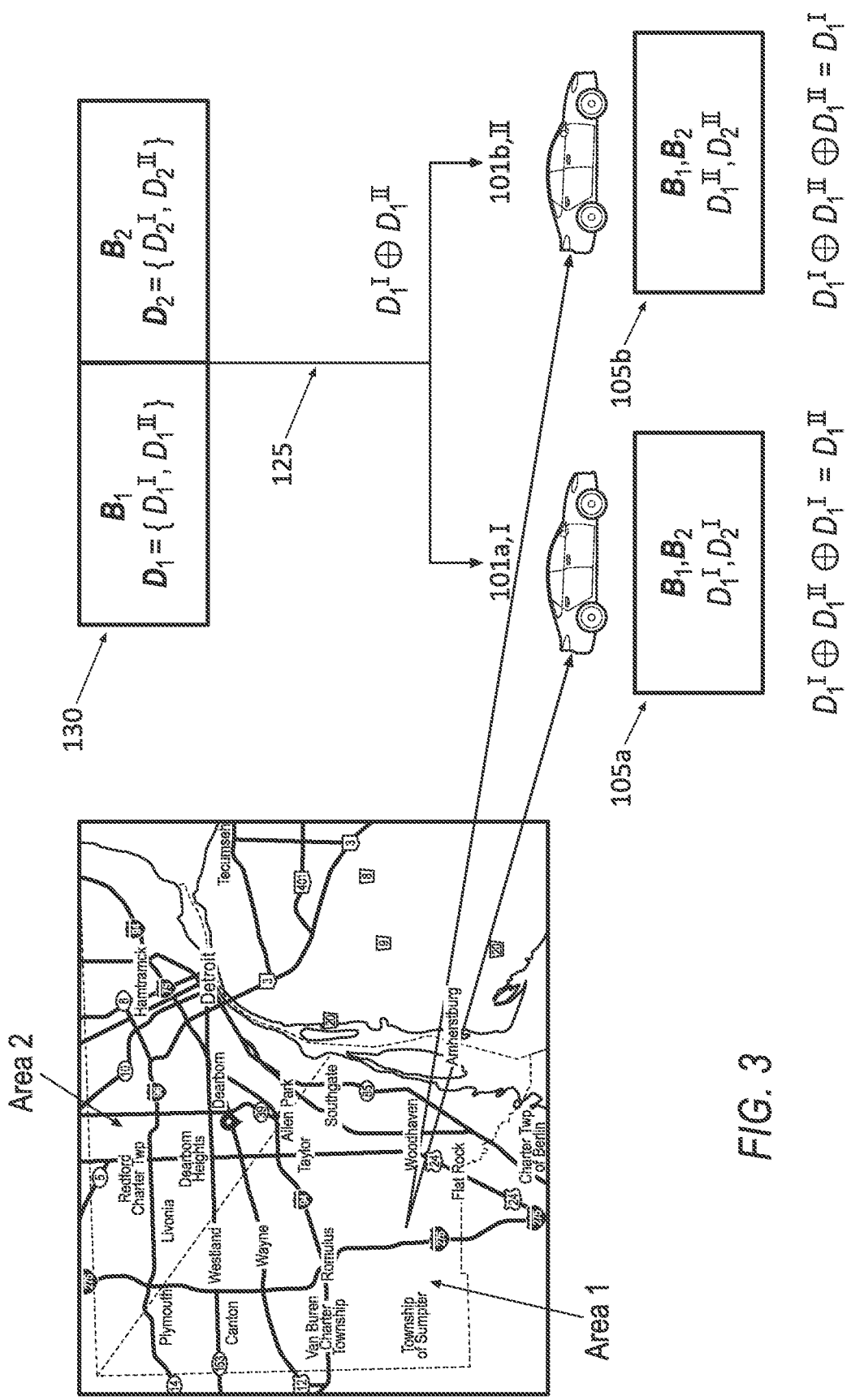
FIG. 3 is a block diagram of a server transmitting the map dataset to a plurality of vehicles.

FIG. 3 is a view of two vehicles 101a, 101b in the first geographic area, Area 1. A first vehicle 101a includes a computer 105a that stores a subset $D_1^{I}$ of the first high-resolution map $D_1$ and a subset $D_2^{I}$ of the second high-resolution map $D_2$ assigned by the server 130. The combined data size (i.e., an amount of data measured in bits) of the assigned subsets $D_1^{I}$, $D_2^{I}$ stored by the computer 105a is smaller than a combined data size of the high-resolution maps $D_1$, $D_2$, reducing the amount of memory space used by the computer 105a. A second vehicle 101b includes a computer 105b that stores a subset $D_1^{II}$ of the first high-resolution map $D_1$ and a subset $D_2^{II}$ of the second high-resolution map $D_2$ assigned by the server 130. The computers 105a, 105b each include both low-resolution maps $B_1$, $B_2$ because the low-resolution maps $B_1$, $B_2$ include limited information for vehicle 101a, 101b operation and take up less memory than the high-resolution maps $D_1$, $D_2$. In the Figures, the Roman numeral I refers to the first vehicle 101a, and the Roman numeral II refers to the second vehicle 101b. The Figures show the first vehicle 101a and the second vehicle 101b as individual vehicles 101. Alternatively, the first vehicle 101a can be part of a first fleet including a plurality of first vehicles 101a, and the second vehicle 101b can be part of a second fleet including a plurality of second vehicles 101b.

Because both vehicles 101a, 101b lack their respective missing subset for the high-resolution map $D_1$, the server 130 can transmit the map dataset $D_1^{I} \oplus D_1^{II}$ to the computer 105a, 105b. That is, the computer 105a lacks the subset $D_1^{II}$ to complete the high-resolution map $D_1$, and the computer 105b lacks the subset $D_1^{I}$ to complete the high-resolution map $D_1$, and the computers 105a, 105b can generate the missing subset from the map dataset $D_1^{I} \oplus D_1^{II}$. The computer 105a can generate the subset $D_1^{II} = (D_1^{I} \oplus D_1^{II}) \oplus D_1^{I}$, and the computer 105b can generate the subset $D_1^{I} = (D_1^{I} \oplus D_1^{II}) \oplus D_1^{II}$. Because the map dataset $D_1^{I} \oplus D_1^{II}$ is substantially the same size as one of the subsets $D_1^{I}$ or $D_1^{II}$, the bandwidth consumption to transmit the map dataset $D_1^{I} \oplus D_1^{II}$ is smaller than a bandwidth consumption to send either of the first high-resolution map $D_1$ or the second high-resolution map $D_2$. The server 130 can transmit only the map dataset to both computers 105a, 105b instead of sending the missing subset $D_1^{II}$ to the computer 105a and the missing subset $D_1^{I}$ to the computer 105b. That is, by identifying and sending only one dataset over the network 125 instead of identifying the specific subset $D_1^{I}$, $D_1^{II}$ for the vehicles 101a, 101b, the server 130 reduces bandwidth consumption to the computers 105a, 105b.

Figure 4:
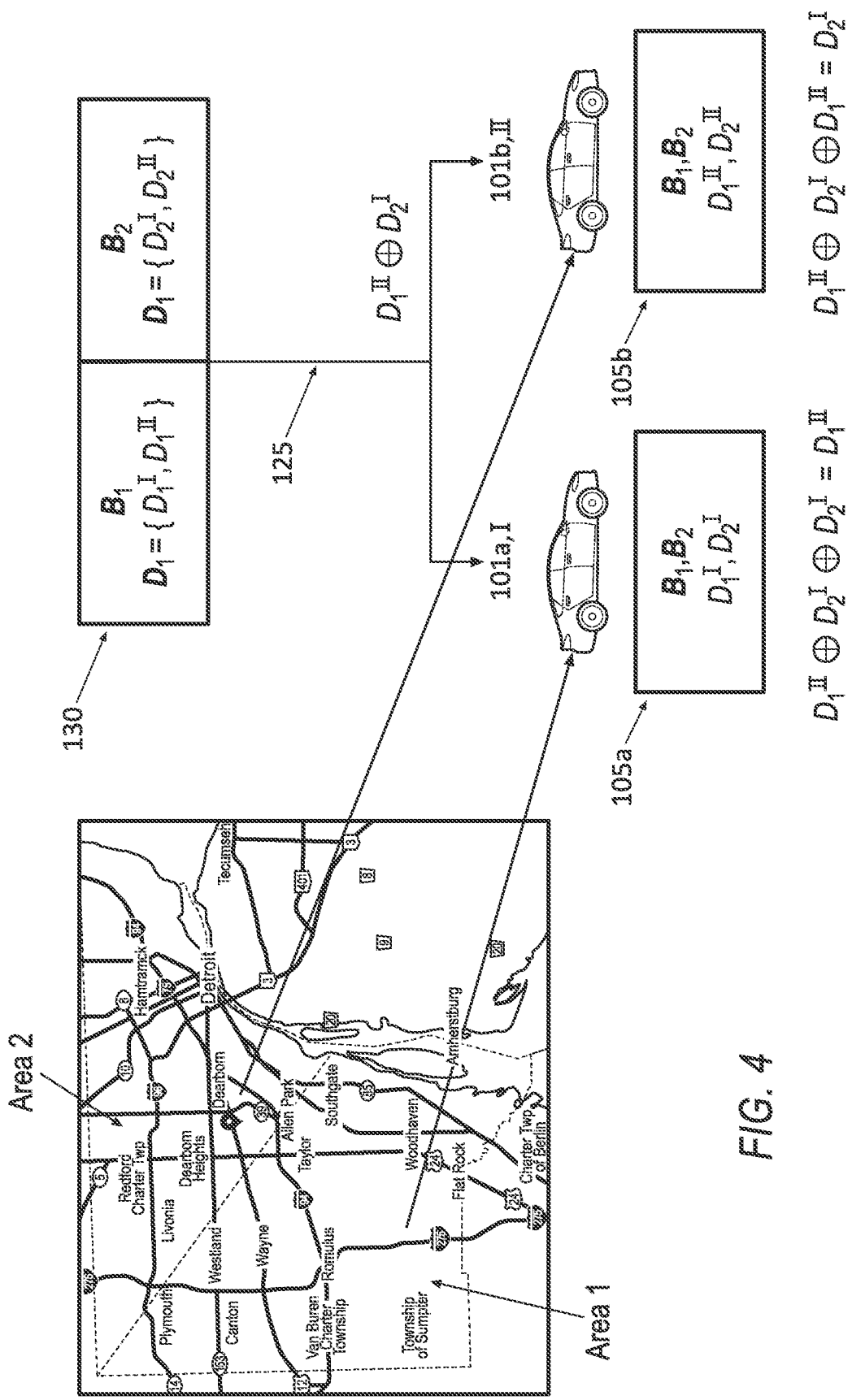
FIG. 4 is a block diagram of the server transmitting another map dataset to the plurality of vehicles.

FIG. 4 is a view of the first vehicle 101a in the first geographic area, Area 1, and the second vehicle 101b in the second geographic area, Area 2. As the vehicles 101a, 101b move along respective routes, the server 130 can identify a new location of the first vehicle 101a and a new location of the second vehicle 101b, and when the geographic are of one of the first and second vehicles 101a, 101b changes, the server 130 can transmit a second map dataset over the network 125 to the first and second vehicles 101a, 101b. The server 130 can transmit a map dataset that is the exclusive disjunction $D_1^{II} \oplus D_2^{I}$ to the computers 105a, 105b. The computer 105a can generate the subset $D_1^{II}$ from the map dataset to complete the high-resolution map $D_1$ with the stored subset $D_1^{I}$, i.e., $D_1^{II} = (D_1^{II} \oplus D_2^{I}) \oplus D_2^{I}$. The computer 105b can generate the subset $D_2^{I}$ from the map dataset to complete the high-resolution map $D_2$ with the stored subset $D_2^{II}$, i.e., $D_2^{I} = (D_1^{II} \oplus D_2^{I}) \oplus D_1^{II}$.

Figure 5:
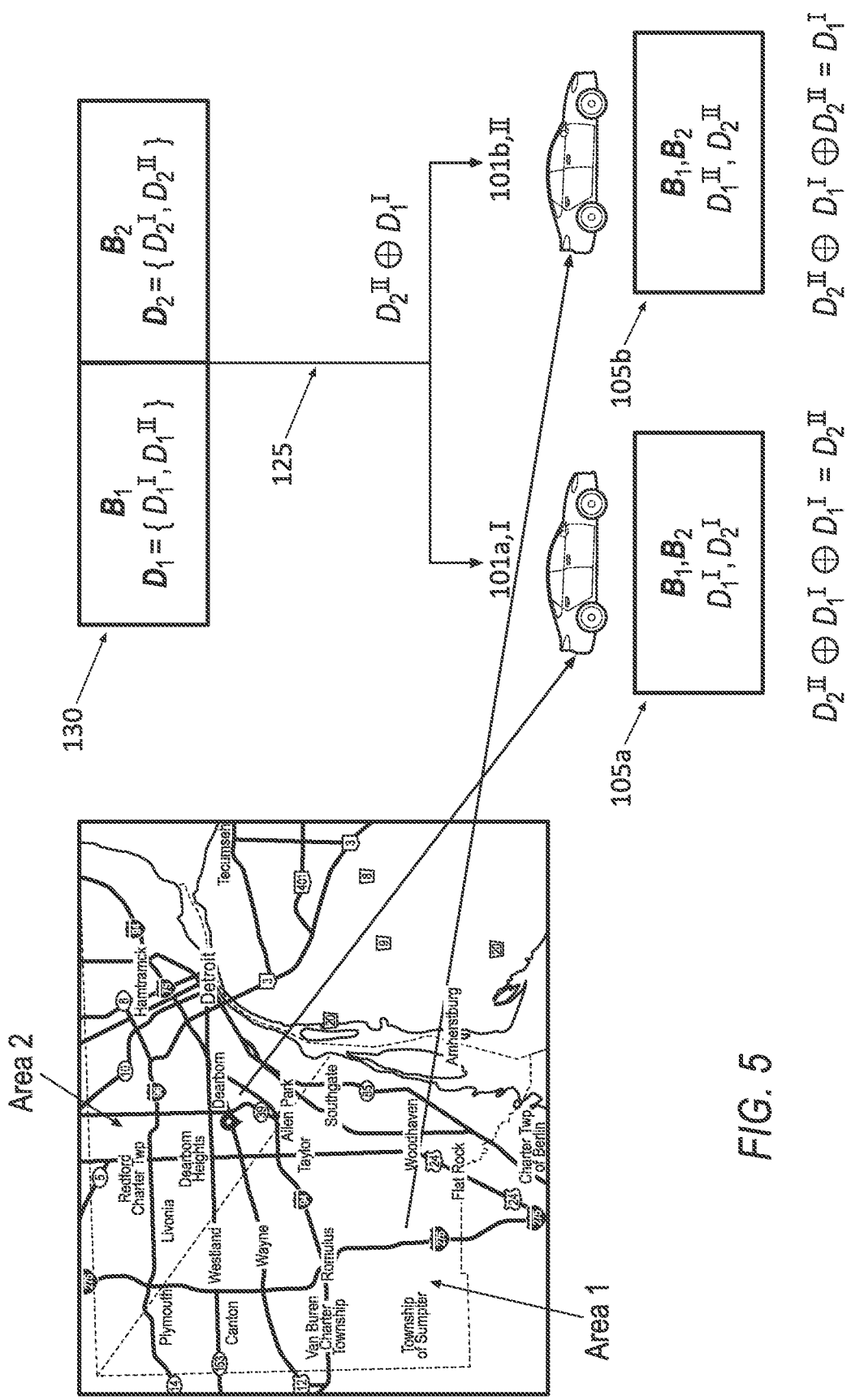
FIG. 5 is a block diagram of the server transmitting another map dataset to the plurality of vehicles.

FIG. 5 is a view of the first vehicle 101a in the second geographic area, Area 2, and the second vehicle 101b in the first geographic area, Area 1. The server 130 can transmit a map dataset that is the exclusive disjunction $D_2^{II} \oplus D_1^{I}$ over the network 125 to the computers 105a, 105b. The computer 105a can generate the subset $D_2^{II}$ from the map dataset to complete the high-resolution map $D_2$ with the stored subset $D_1^{I}$, i.e., $D_2^{II} = (D_2^{II} \oplus D_1^{I}) \oplus D_1^{I}$. The computer 105b can generate the subset $D_1^{I}$ from the map dataset to complete the high-resolution map $D_1$ with the stored subset $D_2^{II}$, i.e., $D_1^{I} = (D_2^{II} \oplus D_1^{I}) \oplus D_2^{II}$.

Figure 6:
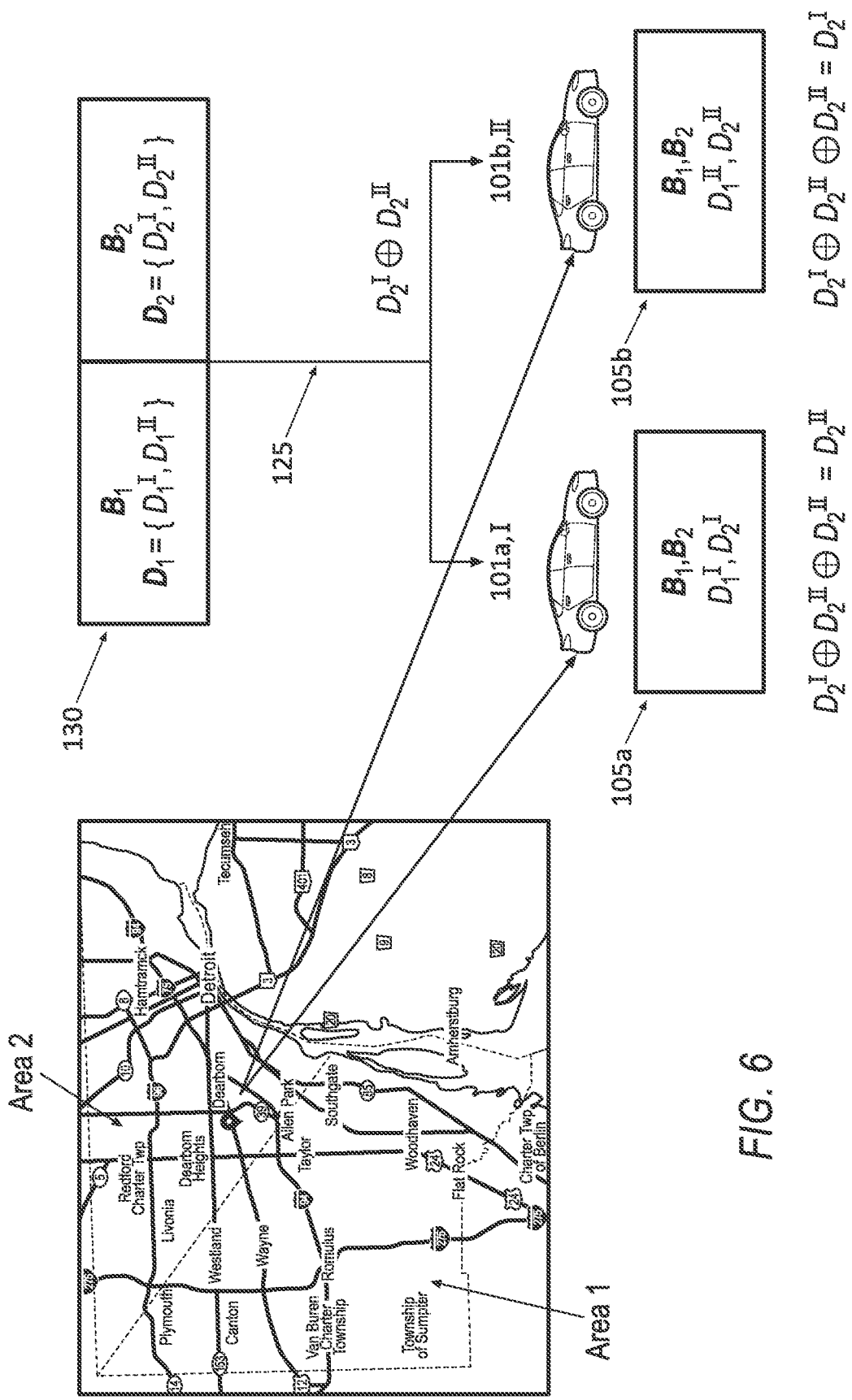
FIG. 6 is a block diagram of the server transmitting another map dataset to the plurality of vehicles.

FIG. 6 is a view of the first vehicle 101a and the second vehicle 101b in the second geographic area, Area 2. The server 130 can transmit a map dataset that is the exclusive disjunction $D_2^{I} \oplus D_2^{II}$ over the network 125 to the computers 105a, 105b. The computer 105a can generate the subset $D_2^{II}$ from the map dataset to complete the high-resolution map $D_2$ with the stored subset $D_1^{I}$, i.e., $D_2^{II} = (D_2^{I} \oplus D_2^{II}) \oplus D_2^{I}$. The computer 105b can generate the subset $D_2^{I}$ from the map dataset to complete the high-resolution map $D_2$ with the stored subset TV, i.e., $D_2^{I} = (D_2^{I} \oplus D_2^{II}) \oplus D_2^{II}$.

Figure 7:
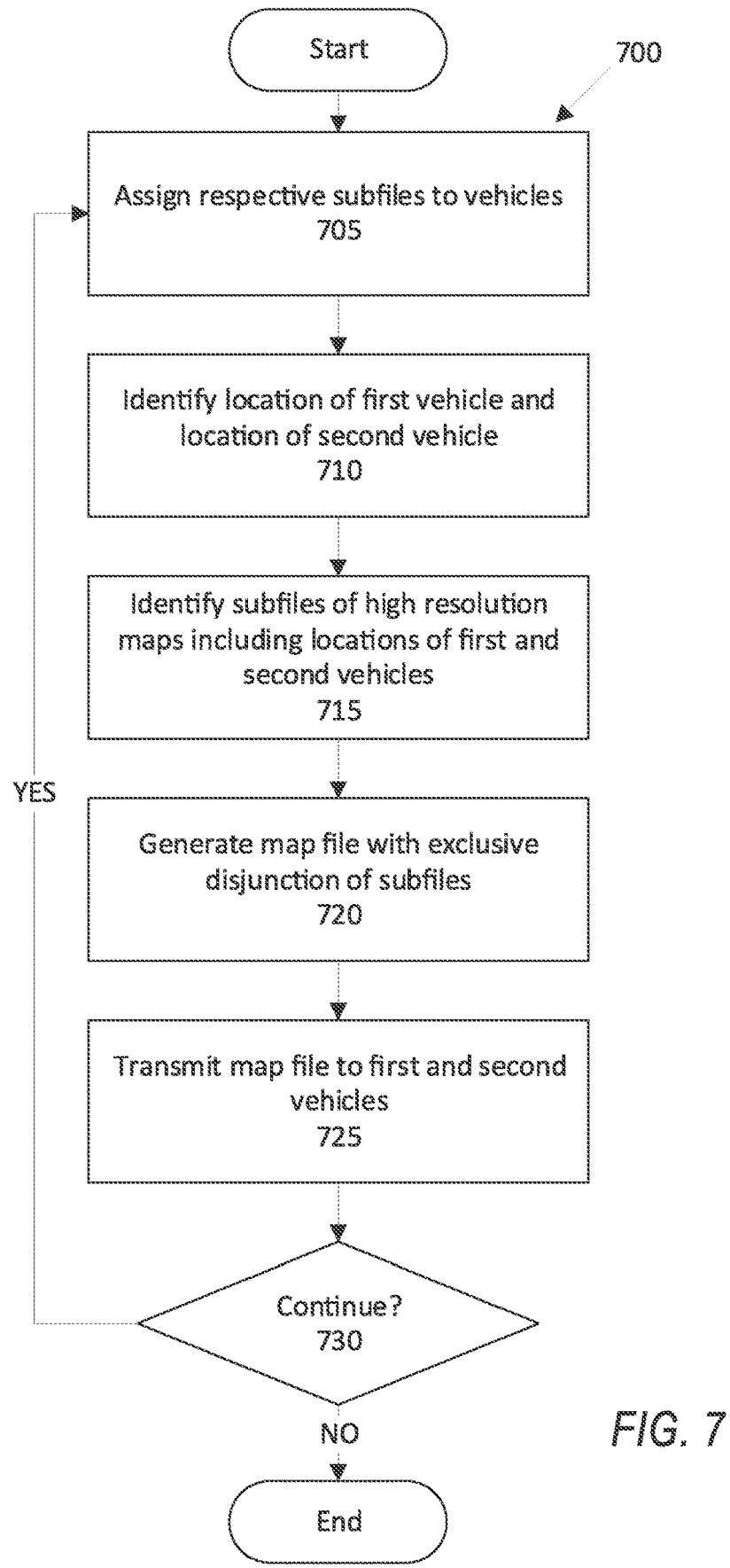
FIG. 7 is a block diagram of an example process for generating a map dataset of a geographic area.

FIG. 7 is a block diagram of an example process 700 for operating a vehicle 101. The process 700 begins in a block 705, in which a server 130 divides a plurality of high-resolution maps into a plurality of subsets, each subset including some but not all of the data of its respective high-resolution map. The server 130 then assigns at least one subset of each high-resolution map to each of a plurality of vehicles 101. By assigning the subsets to the vehicles 101, each vehicle 101 has part of the high-resolution maps, reducing memory usage on a computer 105 of the respective vehicle 101.

Next, in a block 710, the server 130 identifies respective locations of a first vehicle 101a and a second vehicle 101b. The server 130 can compare geo-coordinate data 115 of the first and second vehicles 101a, 101b to determine the respective geographic area (and corresponding high-resolution map) that includes the respective location of the first and second vehicles 101a, 101b.

Next, in a block 715, the server 130 identifies the subsets of the high-resolution maps including the locations of the first and second vehicles 101a, 101b that the computers 105a, 105b lack. As described above, each computer 105a, 105b includes less than all of the subsets of the high-resolution maps, and the server 130 can identify, for each vehicle 101a, 101b, the respective subsets to complete the respective high-resolution map including the location of the vehicle 101a, 101b. For example, in a first geographic area, the first vehicle 101a can have an assigned first subset $D_1^I$ stored in the computer 105a, and the server 130 can identify the second subset $D_1^{II}$ for the first vehicle 101a.

Next, in a block 720, the server 130 generates one or more map datasets, each map dataset being an exclusive disjunction of two of the identified subsets. As described above, an "exclusive disjunction" is the output of the XOR ("exclusive or") function for two subsets. That is, for two subsets $D_1^I$, $D_1^{II}$, the exclusive disjunction $D_1^I \oplus D_1^{II}$ is a dataset in which each bit takes a value of 1 when the respective bits of the subsets $D_1^I$, $D_1^{II}$ differ (i.e., one is 1 and the other is 0) or takes a value of 0 when the respective bits of the subsets $D_1^I$, $D_1^{II}$ are the same (i.e., both are 1 or both are 0). Thus, the exclusive disjunction $D_1^I \oplus D_1^{II}$ indicates all bits that differ between the subsets $D_1^I$, $D_1^{II}$.

Next, in a block 725, the server 130 transmits the map datasets to the first and second vehicles 101a, 101b over the network 125. As described above, by transmitting the map datasets instead of the high-resolution maps, the server 130 reduces bandwidth consumption over the network 125. Upon transmission of the map datasets, the computers 105a, 105b can complete their respective high-resolution maps and move along routes within the geographic areas.

Next, in a block 730, the server 130 determines whether to continue the process 700. For example, the server 130 can determine to continue the process 700 upon detecting that one of the vehicles 101 has moved into a different geographic area requiring a different high-resolution map. If the server 130 determines to continue, the process 700 returns to the block 705. Otherwise, the process 700 ends.

Computing devices discussed herein, including the computer 105 and server 130, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 700, one or more of the steps could be omitted, or the steps could be executed in a different order than shown in FIG. 7. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:

divide a first high-resolution map of a first geographic area into a plurality of subsets, each subset including data for a sub-area that is some but not all of the first geographic area;

divide a second high-resolution map of a second geographic area into a plurality of subsets, each subset including data for a sub-area that is some but not all of the second geographic area;

assign one of the subsets of the first high-resolution map and one of the subsets of the second high-resolution map to a first vehicle;

assign a different one of the subsets of the first high-resolution map and a different one of the subsets of the second high-resolution map to a second vehicle;

identify a location of the first vehicle, a location of the second vehicle, one of the first high-resolution map or the second high-resolution map that includes the location of the first vehicle, and one of the first high-resolution map or the second high-resolution map that includes the location of the second vehicle; and send, to the first vehicle and to the second vehicle, a map dataset that is a result of applying an XOR function to (1) the subset of the identified high-resolution map that includes the location of the first vehicle assigned to the first vehicle and (2) the subset of the identified high-resolution map that includes the location of the second vehicle assigned to the second vehicle.

2. The system of claim 1, wherein the first vehicle includes a vehicle computer programmed to apply the XOR function to the map dataset and the assigned subset of the identified high-resolution map that includes the location of the first vehicle, the assigned subsets of the first high-resolution map and the second high-resolution map stored in the vehicle computer, to recover the data of the first high-resolution map or the data of the second high-resolution map.

3. The system of claim 2, wherein the vehicle computer is further programmed to actuate at least one of a propulsion, a brake, or a steering to move the first vehicle according to the recovered first high-resolution map or the recovered second high-resolution map.

4. The system of claim 2, wherein the result of applying the XOR function of the map dataset and the assigned subset of the identified high-resolution map that includes the location of the first vehicle is a different subset of the identified high-resolution map that includes the location of the first vehicle, and the vehicle computer is further programed to combine the assigned subset and the different subset to recover the first high-resolution map or the second high-resolution map.

5. The system of claim 2, wherein the vehicle computer includes a first low-resolution map of the first geographic area and a second low-resolution map of the second geographic area.

6. The system of claim 2, wherein the second vehicle includes a second vehicle computer programmed to apply the XOR function to the map dataset and the assigned subset of the high-resolution map that includes the location of the second vehicle.

7. The system of claim 1, wherein a data size of the map dataset is smaller than a respective data size of the data of the first high-resolution map or the data of the second high-resolution map.

8. The system of claim 7, wherein a combined data size of the assigned subset of the first high-resolution map and the assigned subset of the second high-resolution map and the map dataset is smaller than a combined data size of the data of the first high-resolution map and the data of the second high-resolution map.

9. The system of claim 1, wherein a bandwidth consumption to transmit the map dataset is smaller than a respective bandwidth consumption to transmit the first high-resolution map or the second high-resolution map.

10. The system of claim 1, wherein the data of the first high-resolution map includes information about roadway lanes of the first geographic area, and the first vehicle includes a low-resolution map of the first geographic area that lacks information about the roadway lanes of the first geographic area.

11. The system of claim 1, wherein the instructions further include instructions to determine a new location of the first vehicle and a new location of the second vehicle and to send a second map dataset that is a result of applying the XOR function to (1) the subset of the identified high-resolution map that includes the new location of the first vehicle and (2) the subset of the identified high-resolution map that includes the new location of the second vehicle.

12. The system of claim 1, wherein the instructions further include instructions to identify respective locations of a plurality of first vehicles in a first fleet and respective locations of a plurality of second vehicles in a second fleet and to send, to the first fleet and to the second fleet, the map dataset based on the respective locations of the plurality of first vehicles and the respective locations of the plurality of second vehicles.

13. A method, comprising:
dividing a first high-resolution map of a first geographic area into a plurality of subsets, each subset including data for a sub-area that is some but not all of the first geographic area;
dividing a second high-resolution map of a second geographic area into a plurality of subsets, each subset including data for a sub-area that is some but not all of the second geographic area;
assigning one of the subsets of the first high-resolution map and one of the subsets of the second high-resolution map to a first vehicle;
assigning a different one of the subsets of the first high-resolution map and a different one of the subsets of the second high-resolution map to a second vehicle;
identifying a location of the first vehicle, a location of the second vehicle, one of the first high-resolution map or the second high-resolution map that includes the location of the first vehicle, and one of the first high-resolution map or the second high-resolution map that includes the location of the second vehicle; and
sending, to the first vehicle and to the second vehicle, a map dataset that is a result of applying an XOR function to (1) the subset of the identified high-resolution map that includes the location of the first vehicle assigned to the first vehicle and (2) the subset of the identified high-resolution map that includes the location of the second vehicle assigned to the second vehicle.

14. The method of claim 13, wherein a data size of the map dataset is smaller than a respective data size of the data of the first high-resolution map or the data of the second high-resolution map.

15. The method of claim 13, wherein a bandwidth consumption to transmit the map dataset is smaller than a respective bandwidth consumption to transmit the data of the first high-resolution map or the data of the second high-resolution map.

16. The method of claim 13, wherein the data of the first high-resolution map includes information about roadway lanes of the first geographic area, and the first vehicle includes a low-resolution map of the first geographic area that lacks information about the roadway lanes of the first geographic area.

17. A system, comprising:
a first vehicle including a first vehicle computer;
a second vehicle including a second vehicle computer;

a server in communication with the first vehicle computer and the second vehicle computer over a network;

means for dividing a first high-resolution map of a first geographic area into a plurality of subsets, each subset including data for a sub-area that is some but not all of the first geographic area;

means for dividing a second high-resolution map of a second geographic area into a plurality of subsets, each subset including data for a sub-area that is some but not all of the second geographic area;

means for assigning one of the subsets of the first high-resolution map and one of the subsets of the second high-resolution map to the first vehicle computer;

means for assigning a different one of the subsets of the first high-resolution map and a different one of the subsets of the second high-resolution map to the second vehicle computer;

means for identifying a location of the first vehicle, a location of the second vehicle, one of the first high-resolution map or the second high-resolution map that includes the location of the first vehicle, and one of the first high-resolution map or the second high-resolution map that includes the location of the second vehicle; and means for sending, to the first vehicle computer and to the second vehicle computer, a map dataset that is a result of applying an XOR function to (1) the subset of the identified high-resolution map that includes the location of the first vehicle assigned to the first vehicle and (2) the subset of the identified high-resolution map that includes the location of the second vehicle assigned to the second vehicle.

18. The system of claim 17, wherein a data size of the map dataset is smaller than a respective data size of the data of the first high-resolution map or the data of the second high-resolution map.

19. The system of claim 17, wherein a bandwidth consumption to transmit the map dataset is smaller than a respective bandwidth consumption to transmit the first high-resolution map or the second high-resolution map.

20. The system of claim 17, wherein the data of the first high-resolution map includes information about roadway lanes of the first geographic area, and the first vehicle computer includes a low-resolution map of the first geographic area that lacks information about the roadway lanes of the first geographic area.

* * * * *